United States Patent
Myung et al.

(10) Patent No.: US 11,088,417 B2
(45) Date of Patent: Aug. 10, 2021

(54) CELL CARTRIDGE AND BATTERY MODULE INCLUDING THE SAME

(71) Applicant: LG CHEM, LTD., Seoul (KR)

(72) Inventors: Eui-Hoon Myung, Daejeon (KR); Seong-Tae Kim, Daejeon (KR); Gyo-Eun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/333,524

(22) PCT Filed: Jul. 19, 2018

(86) PCT No.: PCT/KR2018/008188
§ 371 (c)(1),
(2) Date: Mar. 14, 2019

(87) PCT Pub. No.: WO2019/027162
PCT Pub. Date: Feb. 7, 2019

(65) Prior Publication Data
US 2019/0267587 A1 Aug. 29, 2019

(30) Foreign Application Priority Data

Jul. 31, 2017 (KR) .................. 10-2017-0096809

(51) Int. Cl.
| | | |
|---|---|---|
| H01M 2/10 | (2006.01) | |
| H01M 50/209 | (2021.01) | |
| H01M 50/10 | (2021.01) | |
| H01M 50/20 | (2021.01) | |
| H01M 50/103 | (2021.01) | |
| H01M 50/116 | (2021.01) | |
| H01M 50/531 | (2021.01) | |
| H01M 50/557 | (2021.01) | |

(52) U.S. Cl.
CPC ......... *H01M 50/209* (2021.01); *H01M 50/10* (2021.01); *H01M 50/103* (2021.01); *H01M 50/116* (2021.01); *H01M 50/20* (2021.01); *H01M 50/531* (2021.01); *H01M 50/557* (2021.01)

(58) Field of Classification Search
CPC .... H01M 2/1061; H01M 2/26; H01M 2/0212; H01M 2/10; H01M 2/0217; H01M 2/0275; H01M 2/02; H01M 2/1077
See application file for complete search history.

(56) References Cited

U.S. PATENT DOCUMENTS

| | | | |
|---|---|---|---|
| 2006/0275658 A1* | 12/2006 | Sanada | H01M 2/24 429/185 |
| 2011/0123844 A1 | 5/2011 | Bhardwaj et al. | |
| 2011/0171521 A1 | 7/2011 | Sohn | |
| 2011/0256436 A1 | 10/2011 | Eo | |
| 2012/0040226 A1* | 2/2012 | Kim | H01M 10/647 429/120 |
| 2012/0148887 A1 | 6/2012 | Thaler et al. | |
| 2016/0020438 A1* | 1/2016 | Nakashima | H01M 2/1077 429/153 |
| 2017/0018753 A1 | 1/2017 | Minagata et al. | |
| 2017/0062879 A1 | 3/2017 | Roh et al. | |
| 2017/0190264 A1 | 7/2017 | Kim et al. | |
| 2018/0053920 A1* | 2/2018 | Seo | H01M 10/6554 |
| 2018/0138474 A1* | 5/2018 | Choi | H01M 10/0413 |
| 2018/0315977 A1 | 11/2018 | Park et al. | |
| 2018/0375078 A1 | 12/2018 | Lee et al. | |

FOREIGN PATENT DOCUMENTS

| | | |
|---|---|---|
| CN | 104604010 A | 5/2015 |
| JP | 2005-116429 A | 4/2005 |
| JP | 2010-67422 A | 3/2010 |
| JP | 3169685 U | 8/2011 |
| JP | 2019-512863 A | 5/2017 |
| KR | 10-2006-0125607 A | 12/2006 |
| KR | 10-2015-0033178 A | 4/2015 |
| KR | 10-2015-0128604 A | 11/2015 |
| KR | 10-2017-0055144 A | 5/2017 |
| KR | 10-2017-0062845 A | 6/2017 |
| KR | 10-2017-0073856 A | 6/2017 |
| KR | 10-2017-0082041 A | 7/2017 |
| WO | WO 2015/137060 A1 | 9/2015 |

OTHER PUBLICATIONS

International Search Report for PCT/KR2018/008188 dated Oct. 23, 2018.

* cited by examiner

*Primary Examiner* — Muhammad S Siddiquee
(74) *Attorney, Agent, or Firm* — Birch, Stewart, Kolasch & Birch LLP (57) ABSTRACT

A cell cartridge having a first pouch cell having a first fixing portion extending from a sealing portion thereof, a second pouch cell having a second fixing portion extending from a sealing portion thereof, and a cartridge configured to accommodate a cell stack formed by stacking the first pouch cell and the second pouch cell is provided. The first fixing portion is bent toward the second pouch cell to restrict movement of the second pouch cell. The second fixing portion is bent toward the first pouch cell to restrict movement of the first pouch cell.

11 Claims, 7 Drawing Sheets

CELL CARTRIDGE AND BATTERY MODULE INCLUDING THE SAME

TECHNICAL FIELD

The present disclosure relates to a battery module capable of preventing relative movement of pouch cells, and more particularly, to a battery module having a binding structure between pouch cells so that a pair of pouch cells included in an individual cell cartridge is prevented from moving relative to each other.

The present application claims priority to Korean Patent Application No. 10-2017-0096809 filed on Jul. 31, 2017 in the Republic of Korea, the disclosure of which is incorporated herein by reference.

BACKGROUND ART

In a conventional battery module, in order to fix a stack formed by stacking a plurality of battery cells, both surfaces of the stack are pressed using end plates that cover both broad surfaces of the stack, thereby just preventing the battery cells from moving just along a direction parallel to the stacking direction of the battery cells.

However, the structure of the conventional battery module is inevitably vulnerable to movement in a direction perpendicular to the stacking direction of battery cells. This is because the battery cells may also move due to the minute space present between the battery cell and an inner wall of the module case accommodating the battery cells.

If the battery cell moves in the module case as above, the battery cell may be damaged while the battery module is in use, thereby deteriorating the safety and reliability of the product.

Thus, it is required to apply a binding structure capable of preventing the battery cells from moving in a direction perpendicular to the stacking direction of the battery cells in the battery module.

DISCLOSURE

Technical Problem

The present disclosure is designed to solve the problems of the related art, and therefore the present disclosure is directed to providing a binding structure, which may prevent battery cells from moving in a direction perpendicular to a stacking direction of the battery cells in the battery module.

However, the technical problem to be solved by the present disclosure is not limited to the above, and other objects not mentioned herein will be understood from the following description by those skilled in the art.

Technical Solution

In one aspect of the present disclosure, there is provided a cell cartridge, comprising: a first pouch cell having a first fixing portion extending from a sealing portion thereof; a second pouch cell having a second fixing portion extending from a sealing portion thereof; and a cartridge configured to accommodate a cell stack formed by stacking the first pouch cell and the second pouch cell, wherein the first fixing portion is bent toward the second pouch cell to restrict movement of the second pouch cell, and wherein the second fixing portion is bent toward the first pouch cell to restrict movement of the first pouch cell.

The first fixing portion may be provided as a plurality of first fixing portions and the second fixing portion may be provided as a plurality of second fixing portions.

The first fixing portions may be spaced apart along a periphery of the first pouch cell, and the second fixing portions may be spaced apart along a periphery of the second pouch cell.

The first fixing portions may be formed in a region except for an area where an electrode lead of the first pouch cell is drawn, and the second fixing portions may be formed in a region except for an area where an electrode lead of the second pouch cell is drawn.

The first fixing portions and the second fixing portions may be arranged alternately along a periphery of the cell stack.

The first fixing portion may extend to an accommodation portion of the second pouch cell and is attached to the second pouch cell, and the second fixing portion may extend to an accommodation portion of the first pouch cell and is attached to the first pouch cell.

The first fixing portion and the second fixing portion may be integrally formed with the sealing portion of the first pouch cell and the sealing portion of the second pouch cell, respectively.

The cartridge may include a first cartridge and a second cartridge. The first pouch and the second pouch may be located between the first cartridge and the second cartridge.

Each of the first cartridge and the second cartridge may include a through hole to receive a bolt.

Meanwhile, in another aspect of the present disclosure, there is also provided a battery module, which comprises a cell cartridge stack formed by stacking a plurality of cell cartridges according to an embodiment of the present disclosure; and a pair of end plates configured to cover opposite surfaces of the cell cartridge stack.

A fastening clip may extend from a first end plate of the pair of end plates to a second end plate of the pair of end plates.

Advantageous Effects

According to the present disclosure, it is possible to prevent battery cells from moving in a direction perpendicular to a stacking direction of the battery cells inside a cartridge, thereby reducing damage caused to the pouch cells due to movement of the pair of pouch cells in the cartridge and also reducing the occurrence of a failed battery module and the danger in use of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall configuration of a battery module according to an embodiment of the present disclosure will be described with reference to FIGS. 1 to 3.

Figure 1:
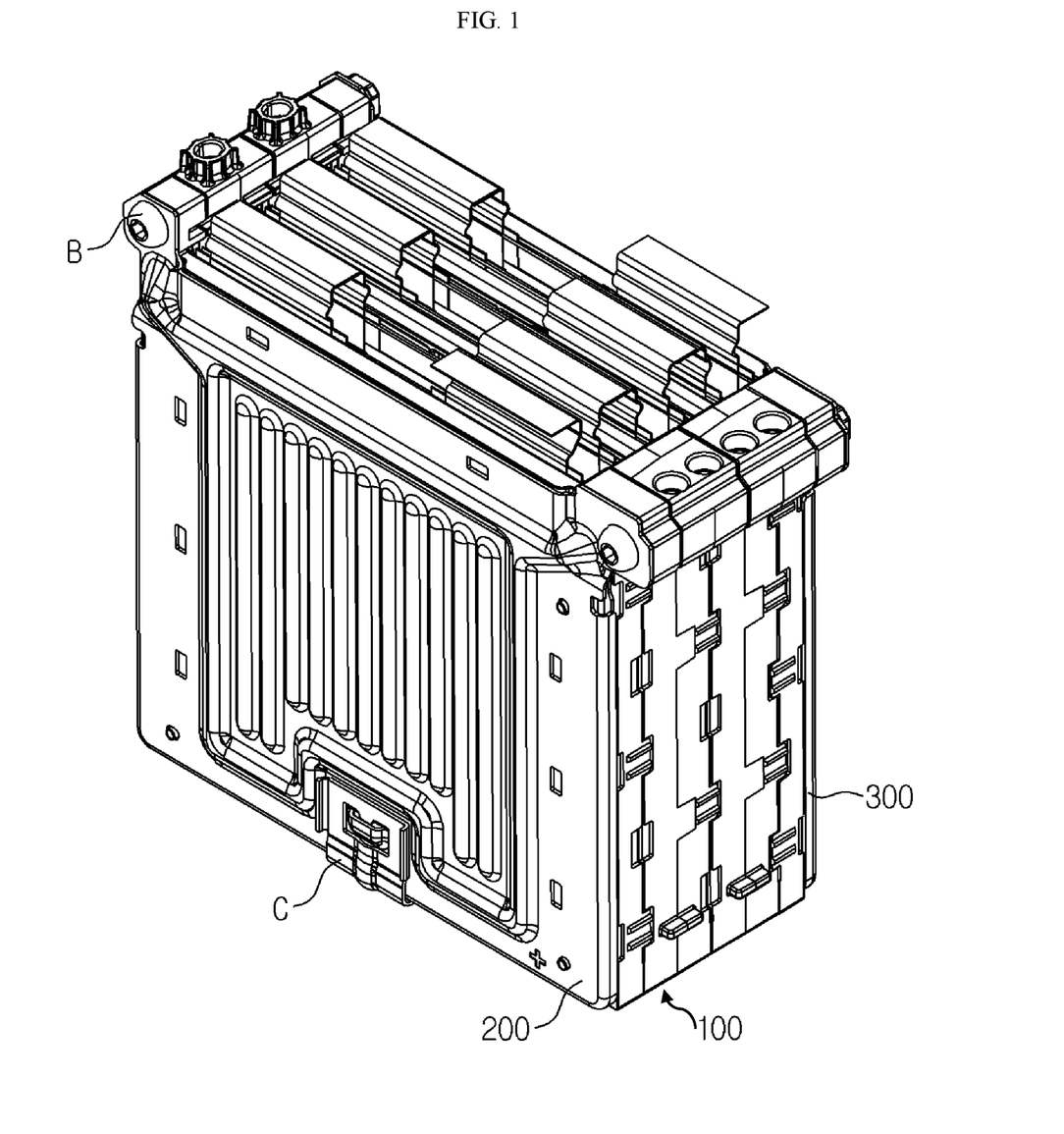
FIG. 1 is a perspective view showing a battery module according to an embodiment of the present disclosure in an assembled state.
Figure 2:
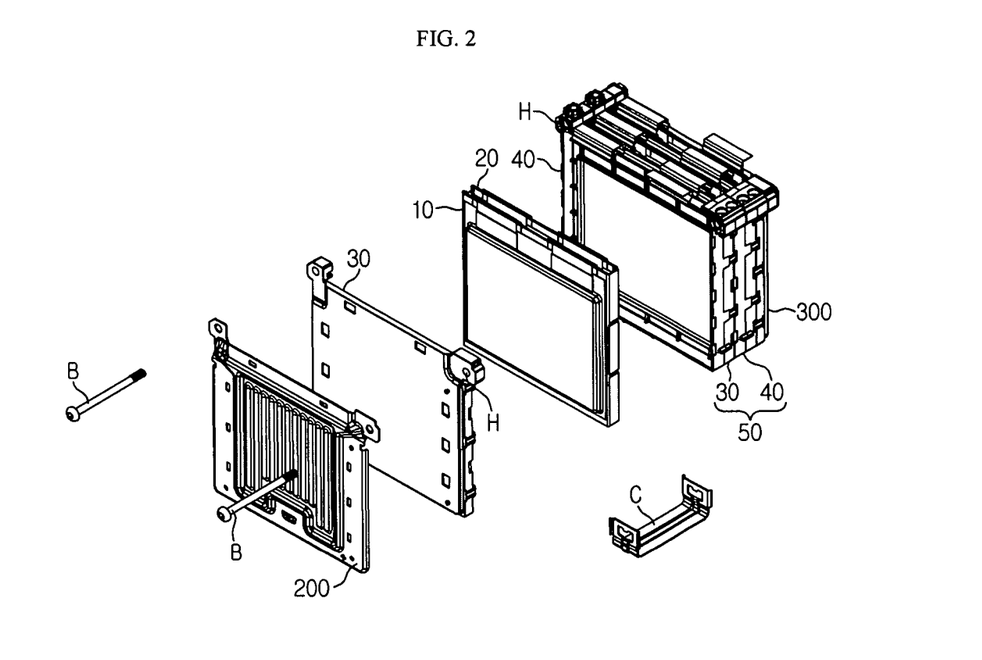
FIG. 2 is an exploded perspective view showing the battery module according to an embodiment of the present disclosure.
Figure 3:
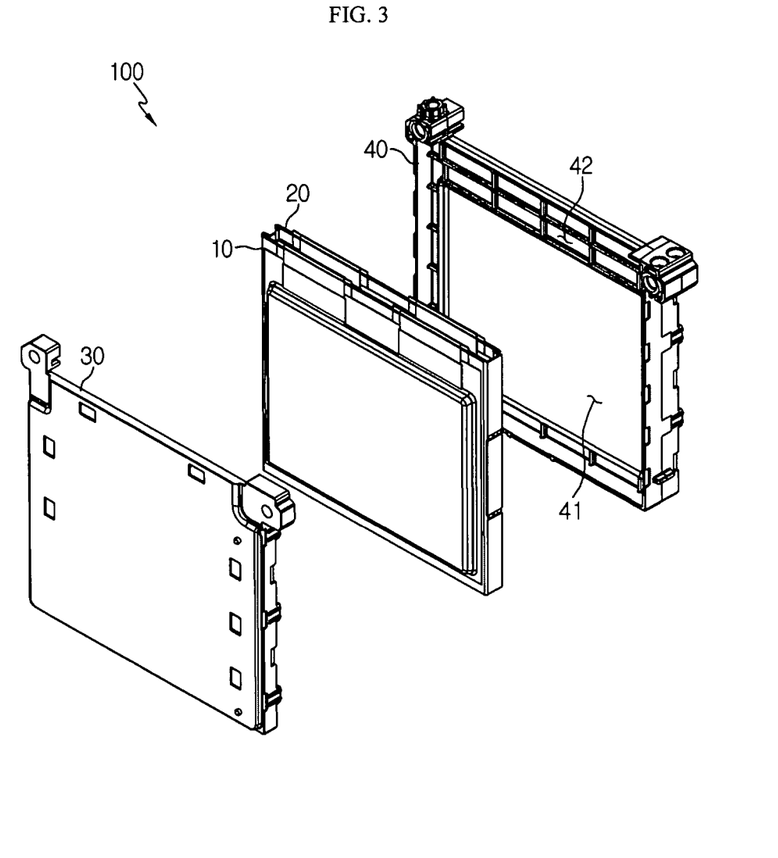
FIG. 3 is an exploded perspective view showing a cell cartridge according to an embodiment of the present disclosure.

FIG. 1 is a perspective view showing a battery module according to an embodiment of the present disclosure in an assembled state, FIG. 2 is an exploded perspective view showing the battery module according to an embodiment of the present disclosure, and FIG. 3 is an exploded perspective view showing a cell cartridge according to an embodiment of the present disclosure.

Referring to FIGS. 1 to 3, a battery module according to an embodiment of the present disclosure includes a cell cartridge stack formed by stacking a plurality of cell cartridges 100 and a pair of end plates 200, 300 covering both surfaces of the cell cartridge stack. End plate 200 may be referred to as a first end plate and end plate 300 may be referred to as a second end plate.

The cell cartridge 100 includes a cell stack formed by stacking a pair of pouch cells 10, 20 and a cartridge 50 for accommodating the cell stack. The cartridge 50 includes a first cartridge 30 coupled to one side surface of the cell stack and a second cartridge 40 coupled to the other side surface of the cell stack.

Meanwhile, the pair of first cartridge 30 and second cartridge 40 of the cell cartridge 100 and the end plates 200, 300 have fastening holes H formed in corner regions at both sides of a top portion thereof. A fastening bolt B is inserted into the fastening holes H so that the first cartridge 30 and the second cartridge 40 are fastened together and the plurality of cell cartridges 100 are fastened together. Meanwhile, a fastening clip C is mounted at a bottom center of the pair of end plates 200, 300, respectively, so that the binding force between the end plates 200, 300 may be more firmly maintained.

In addition, by the fastening using the bolt B and the clip C, the cell cartridge stack and the end plates 200, 300 are also fastened to each other, and by doing so, the end plates 200, 300 press the cell cartridge stack so that the plurality of cell cartridges 100 are prevented from moving relative to each other.

Though the figures of the present disclosure depict only a case where three cell cartridges 100 are included in one battery module, the present disclosure is not limited thereto, and the number of cell cartridges 100 may be increased or decreased depending on the required battery voltage and/or capacity.

Next, the cell cartridge 100 according to an embodiment of the present disclosure will be described in more detail with reference to FIGS. 4 to 6 along with FIG. 3.

Figure 4:
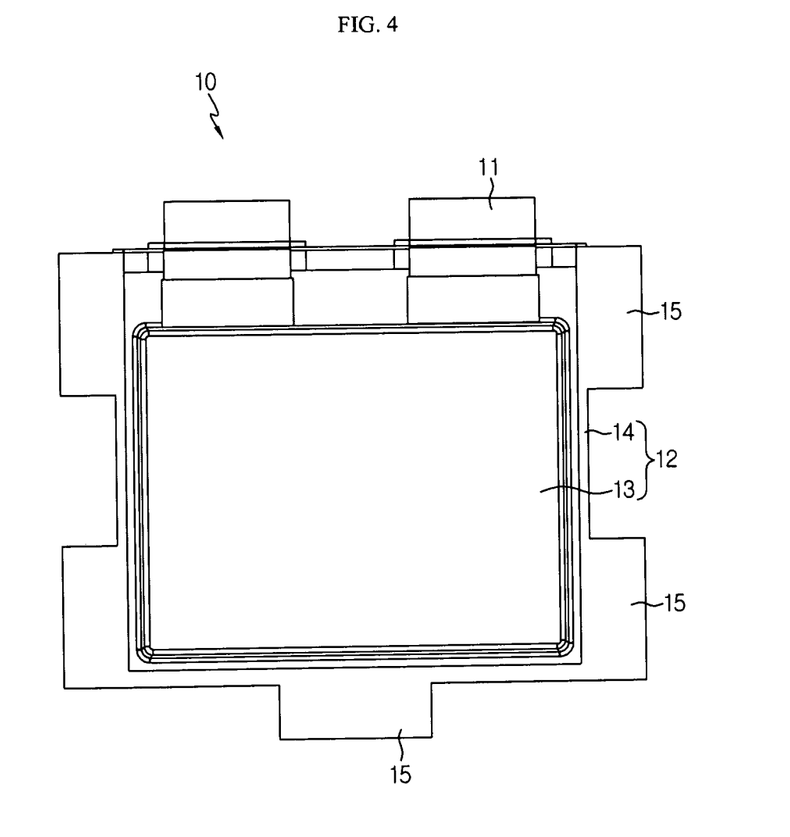
FIG. 4 is a plane view showing a first pouch cell employed in the present disclosure.
Figure 5:
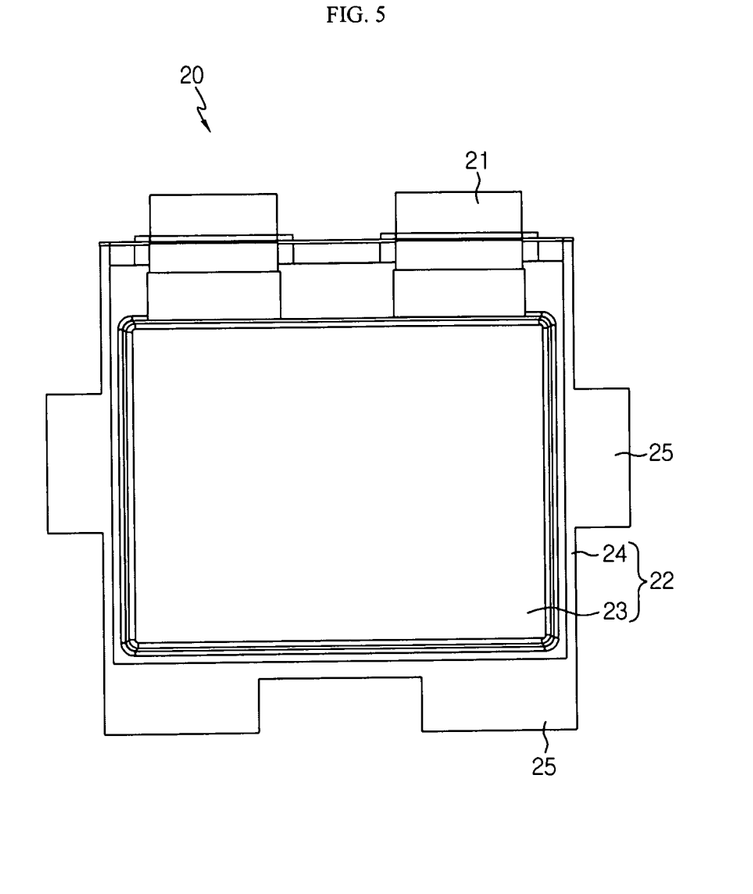
FIG. 5 is a plane view showing a second pouch cell employed in the present disclosure.
Figure 6:
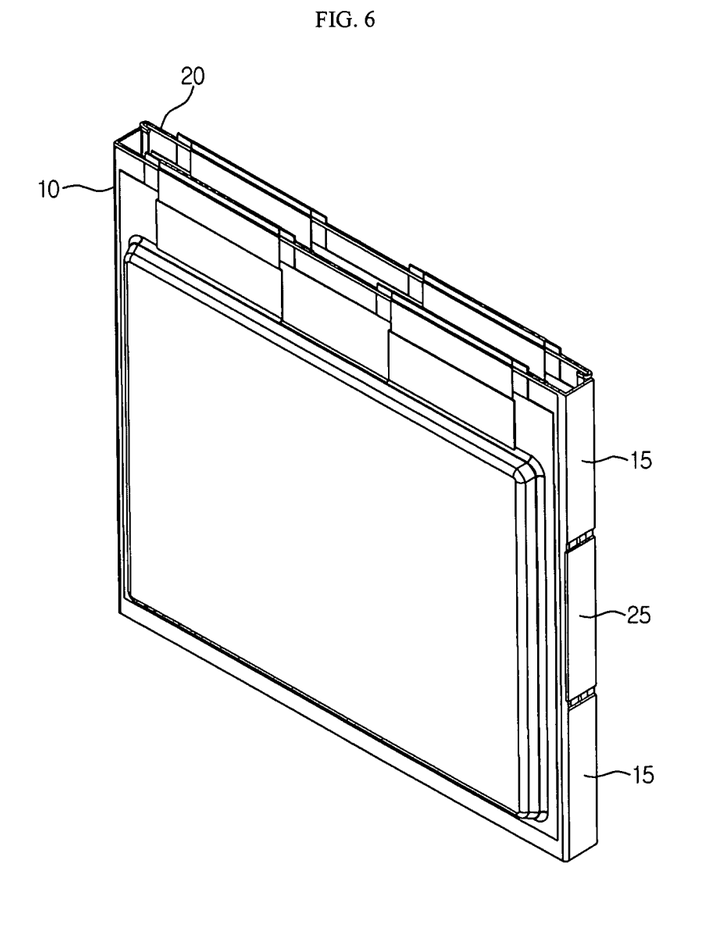
FIG. 6 is a perspective view showing a state where the first pouch cell and the second pouch cell employed in the present disclosure are bound.

FIG. 4 is a plane view showing a first pouch cell employed in the present disclosure, FIG. 5 is a plane view showing a second pouch cell employed in the present disclosure, and FIG. 6 is a perspective view showing a state where the first pouch cell and the second pouch cell employed in the present disclosure are bound.

Referring to FIGS. 3 to 6, the first pouch cell 10 of the cell cartridge 100 includes an electrode assembly (not shown), a pair of electrode leads 11, a pouch case 12, and a plurality of first fixing portions 15.

Though not shown in the figures, the electrode assembly is configured so that separators are interposed between positive electrode plates and negative electrode plates, which are alternately stacked on one another, and the separators are preferably located at both outermost sides of the electrode assembly for insulation.

The positive electrode plate includes a positive electrode current collector and a positive electrode active material layer coated on at least one surface of the positive electrode current collector. A positive electrode uncoated region not coated with a positive electrode active material is formed on one side end of the positive electrode current collector, and the positive electrode uncoated region functions as a positive electrode tab connected to the electrode lead 11.

Likewise, the negative electrode plate includes a negative electrode current collector and a negative electrode active material layer coated on at least one surface of the negative electrode current collector. An uncoated region not coated with a negative electrode active material is formed on one side end of the negative electrode current collector, and the uncoated region functions as a negative electrode tab connected to the electrode lead 11.

In addition, the separator is interposed between the positive electrode plate and the negative electrode plate to prevent the electrode plates having different polarities from directly contacting each other. The separator may be made of a porous material in order to allow ions to move between the positive electrode plate and the negative electrode plate by using the electrolyte as a medium.

The electrode lead 11 is classified into a positive electrode lead connected to the positive electrode tab and a negative electrode lead connected to the negative electrode tab, and the positive and negative electrode leads are drawn and extended in parallel in one direction of the pouch case 12.

The pouch case 12 may include an upper case covering an upper portion of the electrode assembly and a lower case covering a lower portion thereof, and the upper case and the lower case may respectively be a multilayered pouch film including a first resin layer, a metal layer and a second resin layer.

In this case, the first resin layer forming an innermost side of the pouch film may be made of a resin with a heat-fusing property so that the upper and lower cases may be easily fused to each other when heat is applied thereto in a state where the upper and lower cases are in contact with each other.

The pouch case 12 includes two portions, namely an accommodation portion 13 for accommodating the electrode assembly (not shown) and a sealing portion 14 extending along the circumferential direction the accommodation portion. Here, the sealing portion 14 is thermally fused in a state in which the electrode lead 11 is drawn out to the outside of the pouch case 12 to seal the pouch case 12.

The first fixing portion 15 is provided to extend outward from the sealing portion 14 of the first pouch cell 10 and is bent toward the second pouch cell 20 stacked to face the first pouch cell 10, thereby restricting movement of the second pouch cell 20.

The first fixing portion 15 is provided in plural, and the plurality of first fixing portions 15 are spaced apart from each other along a periphery of the first pouch cell 10 and are formed except for a region where the electrode leads 11 are drawn out.

The second pouch cell 20 includes an electrode assembly (not shown), a pair of electrode leads 21, a pouch case 22, and a plurality of second fixing portions 25.

The first pouch cell 10 and the second pouch cell 20 are substantially identical to each other except the locations where the fixing portions 15, 25 are formed. Thus, the components other than the second fixing portion 25 will not be described in detail here.

The second fixing portion 25 is provided to extend outward from a sealing portion 24 of the second pouch cell 20 and is bent toward the first pouch cell 10 stacked to face the second pouch cell 20 to restrict movement of the first pouch cell 10.

The second fixing portion 25 is provided in plural, and the plurality of second fixing portions 25 are spaced apart from each other along a periphery of the second pouch cell 20 and are formed except for a region where the electrode leads 21 are drawn out.

In addition, the second fixing portion 25 is provided at a position where the first fixing portion 15 is not formed when the first pouch cell 10 and the second pouch cell 20 are stacked. Accordingly, the first fixing portions 15 and the second fixing portions 25 are alternately arranged along the periphery of the cell stack formed by stacking the first pouch cell 10 and the second pouch cell 20.

The binding force between the pair of pouch cells 10, 20 is increased due to the fixing portions 15, 25, which are bent toward the pouch cells 20, 10 located at the opposite sides, so that the first pouch cell 10 and the second pouch cell 20 do not move relative to each other.

The fixing portions 15, 25 are integrally formed with the pouch cases 12, 22 and are substantially formed by elongating the sealing portions 14, 24 longer toward the outside.

Next, another example of the binding pattern between the pair of pouch cells 10, 20 employed in the present disclosure will be described with reference to FIG. 7.

Figure 7:
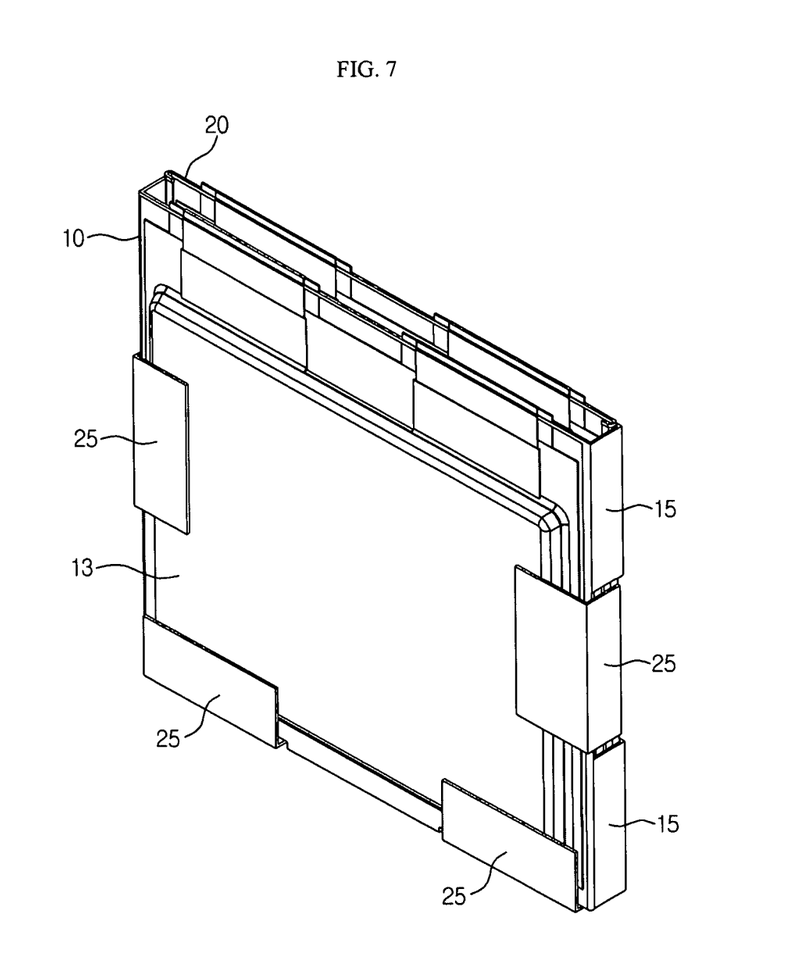
FIG. 7 is a perspective view showing a state where the first pouch cell and the second pouch cell employed in the present disclosure are bound by applying a binding pattern different from FIG. 6.

FIG. 7 is a perspective view showing a state where the first pouch cell and the second pouch cell employed in the present disclosure are bound by applying a binding pattern different from FIG. 6.

The cell stack shown in FIG. 7 is substantially identical to the cell stack shown in FIG. 6, except that the fixing portions 15, 25 are formed longer and attached to the outer surface of the cell stack.

Thus, the cell stack shown in FIG. 7 will be explained based on the fixing portions 15, 25 having different features, and the other components substantially identical will not described in detail here.

In this embodiment, the fixing portions 15, 25 may extend to the accommodation portions 13, 23 of the pouch cells 20, 10 at opposite sides and be attached onto the accommodation portions 13, 23 by an adhesive or the like. By doing so, the binding force between the first pouch cell 10 and the second pouch cell 20 is increased further so that the first pouch cell 10 and the second pouch cell 20 do not move relative to each other inside the cartridge 50.

Referring to FIG. 3 again, the cell stack having the above structure with an enhanced binding force is accommodated in the cartridge 50.

The cartridge 50 includes a first cartridge 30 coupled to one side surface of the cell stack and a second cartridge 40 coupled to the other side surface of the cell stack. Each of the cartridges 30, 40 has a cell accommodation portion 41 for giving a space in which the pouch cells 10, 20 may be accommodated, and a lead drawing portion 42 giving a space through which the electrode leads 11, 21 may be drawn out of the cartridge 50. When the plurality of cell cartridges 100 are connected, the electrode leads drawn through the lead drawing portion 42 are connected to each other, thereby implementing a battery module in which the plurality of pouch cells are connected in series, in parallel, or a combination thereof.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cell cartridge, comprising:
   a first pouch cell having a plurality of first fixing portions extending from a sealing portion thereof;
   a second pouch cell having a plurality of second fixing portions extending from a sealing portion thereof; and
   a cartridge configured to accommodate a cell stack formed by stacking the first pouch cell and the second pouch cell,
   wherein each first fixing portion is bent toward the second pouch cell to restrict movement of the second pouch cell, and
   wherein each second fixing portion is bent toward the first pouch cell to restrict movement of the first pouch cell.

2. The cell cartridge according to claim 1,
   wherein the first fixing portions are spaced apart along a periphery of the first pouch cell, and
   wherein the second fixing portions are spaced apart along a periphery of the second pouch cell.

3. The cell cartridge according to claim 2,
   wherein the first fixing portions are formed in a region except for an area where an electrode lead of the first pouch cell is drawn, and
   wherein the second fixing portions are formed in a region except for an area where an electrode lead of the second pouch cell is drawn.

4. The cell cartridge according to claim 2,
   wherein the first fixing portions and the second fixing portions are arranged alternately along a periphery of the cell stack 5. The cell cartridge according to claim 1,
wherein each first fixing portion extends to an accommodation portion of the second pouch cell and is attached to the second pouch cell, and
wherein each second fixing portion extends to an accommodation portion of the first pouch cell and is attached to the first pouch cell.

6. The cell cartridge according to claim 1,
wherein each first fixing portion and each second fixing portion are integrally formed with the sealing portion of the first pouch cell and the sealing portion of the second pouch cell, respectively.

7. A battery module, comprising:
a cell cartridge stack formed by stacking a plurality of cell cartridges defined in claim 1; and
a pair of end plates configured to cover opposite surfaces of the cell cartridge stack.

8. The battery module of claim 7, further comprising a fastening clip extending from a first end plate of the pair of end plates to a second end plate of the pair of end plates.

9. The cell cartridge of claim 1, wherein the cartridge comprises:
a first cartridge; and
a second cartridge, and
wherein the first pouch and the second pouch are located between the first cartridge and the second cartridge.

10. The cell cartridge of claim 9, wherein each of the first cartridge and the second cartridge includes a through hole to receive a bolt.

11. A cell cartridge, comprising:
a first pouch cell having a plurality of first fixing portions extending from a sealing portion thereof;
a second pouch cell having a plurality of second fixing portions extending from a sealing portion thereof; and
a cartridge configured to accommodate a cell stack formed by stacking the first pouch cell and the second pouch cell,
wherein each first fixing portion is bent toward the second pouch cell to restrict movement of the second pouch cell,
wherein each second fixing portion is bent toward the first pouch cell to restrict movement of the first pouch cell,
wherein the first fixing portions are spaced apart along a periphery of the first pouch cell,
wherein the second fixing portions are spaced apart along a periphery of the second pouch cell,
wherein at least one of the first fixing portions is opposite the area where the electrode lead of the first pouch cell is drawn, and
wherein at least one of the second fixing portions is opposite the area where the electrode lead of the second pouch cell is drawn.

\* \* \* \* \*